United States Patent [19]

Farnand et al.

[11] Patent Number: 4,814,084

[45] Date of Patent: Mar. 21, 1989

[54] REVERSE OSMOSIS MEMBRANE OF CELLULOSIC MATERIAL

[75] Inventors: Brian Farnand, Ottawa; Takeshi Matsuura, Gloucester; Srinivasa Sourirajan, Ottawa, all of Canada

[73] Assignee: Canadian Patents and Development Limited, Ottawa, Canada

[21] Appl. No.: 239,349

[22] Filed: Sep. 1, 1988

[30] Foreign Application Priority Data

Oct. 5, 1987 [CA] Canada .................................. 548640

[51] Int. Cl.$^4$ .............................................. B01D 13/04
[52] U.S. Cl. ................................. 210/500.29; 264/41; 264/298; 264/DIG. 48; 264/DIG. 62
[58] Field of Search ........... 210/500.29, 500.3, 500.31, 210/500.32; 264/41, 48, 86

[56] References Cited

U.S. PATENT DOCUMENTS 4,323,627  4/1982  Joh ........................................ 264/41

Primary Examiner—Frank Sever
Attorney, Agent, or Firm—Juliusz Szereszewski

[57] ABSTRACT

There is provided a method of manufacturing cellulose membranes with pore radii less than $30 \times 10^{-10}$ m, suitable for reverse osmosis applications. The method comprises dissolving a cellulosic material in a DMSO/PF solvent at a temperature about 125° C. for about 90 min., cooling and casting the solution at room temperature, evaporating the solvent at a temperature of 140°–180° C. and gelling the resulting membrane in a protic solvent, e.g. ethanol or water.

6 Claims, No Drawings

REVERSE OSMOSIS MEMBRANE OF CELLULOSIC MATERIAL

This invention relates to reverse osmosis membranes and particularly to a method of manufacturing such membranes of cellulose or cellulosic material.

BACKGROUND OF THE INVENTION

Reverse osmosis (RO) membranes are widely used in the separation of water from various aqueous solutions, for instance for water desalination. Such membranes have been made for example from cellulose acetate. The processes for the preparation of such membranes are described in Loeb et al. U.S. Pat. Nos. 3,133,132 and 3,133,137, in Cannon U.S. Pat. No. 3,460,683 and in MacDonald et al. U.S. Pat. No. 3,842,515. The processes involve generally: preparation of a suitable casting solution, casting the solution onto a substrate, evaporation of the solvent and gelling the cast in a gelling medium. The casting solutions used in the processes referred to hereinabove generally contain acetone.

It has also been known for a number of years to manufacture membranes by regenerating cellulose from cellulose acetate or from cellulose nitrate.

While cellulose acetate membranes are useful, cellulose membranes have a distinct advantage over the former. The advantage is in their higher mechanical strength and lower affinity to organic solute compounds in aqueous solutions. Thus, cellulose membranes are less susceptible to fouling by organic contaminants. The relatively small affinity to organic compounds also enables celulosic membranes to withstand the environment of nonaqueous solvents.

It is also known that membranes may be obtained from cellulose by dissolving a cellulose-containing material in dimethyl sulfoxide (DMSO) and paraformaldehyde (PF). These two compounds appear to be excellent and nondegrading solvents of cellulose when applied in certain proportions. The formation of methylol cellulose is reported to be crucial to the dissolution mechanism. The DMSO/PF solvent system is capable of dissolving a variety of cellulosic materials with weight average degrees of polymerization ranging from 16 to over 8000.

Seymour and Johnson, Journal of Applied Polymer Science, Vol. 20, 3425 (1976), have attempted to prepare cellulose solutions in the DMSO/PF solvent with concentrations up to 10%. The temperature of dissolution in these experiments was 65° to 80° C., and it was found that complete cellulose solution was only achieved with cellulose concentration about 0.5%. The molar ratio of paraformaldehyde to cellulose was about 10:1. Such mixtures of cellulose and PF in dimethyl sulfoxide produced homogeneous solutions or gels from which cellulose was precipitated by adding dioxane, alcohol or water. However, precipitation in water or ethanol, wet spinning in water or alcohol as well as solvent evaporation resulted in brittle films and weak fibers.

(a) dissolving cellulose (or cellulosic material) in a dimethyl sulfoxide/paraformaldehyde solvent to form a casting solution containing
  (i) 12-15 wt % cellulose,
  (ii) 70-76 wt % dimethyl sulfoxide, and
  (iii) 12-15 wt % paraformaldehyde at an elevated temperature while formaldehyde gas is evolved and until a transparent casting solution is formed, (b) cooling the casting solution to about room temperature, (c) casting the cooled solution at about room temperature, (d) evaporating the solvent from the cast solution at a temperature in the range 140°-180° C., and (e) gelling the cast solution in a gelling medium comprising at least one liquid selected from the group consisting of water, an alcohol having carbon atoms in the range 1 to 4, acetone and methyl ethyl ketone at a temperature of 0°-30° C.

Preferably, the temperature of evaporation is about 170° to 175° C. The gelling medium must be a protic solvent to achieve a satisfactory gellation.

Following the work of Seymour and Johnson, Doshi and Webb reported a relation between the concentration of cellulose in the casting solution (or in the gel) and the pore sizes of the membranes obtained thereby (Proceedings of 1983 International Dissolving and Specialty Pulps Conference, Boston, April 5-8, 1983, TAPPI Press, Atlantic, Ga., 41 (1983)). The membranes obtained by Doshi and Webb had pore sizes of ca. $750 \times 10^{-10}$ m (750 Å).

Uragami et al. (Sep. Sci. and Tech., 17(2), 307 (1982) obtained casting solutions based on the dissolution method of Seymour and Johnson with cellulose concentrations below 9 wt. %, wherein the solvent was evaporated below 110° C.

For certain reverse osmosis applications such as water desalination, it is desirable to obtain membranes of pore radii smaller than $30 \times 10^{-10}$ m. Such membranes can be produced from cellulose acetate but have not thus far been obtained from cellulose. Such need exists in view of the advantages of cellulosic membranes as explained above.

STATEMENT OF INVENTION

According to the present invention, an improved method is provided for manufacturing reverse osmosis membranes of cellulose or cellulosic material. The method comprises the steps of:

DETAILED DESCRIPTION OF THE INVENTION

A number of tests were conducted to verify the invention and establish the range of parameters leading to acceptable membranes. A typical experimental procedure is described below.

Known weights of cellulose powder (Baker), paraformaldehyde powder and DMSO (Fisher) totalling ca. 200 g were slurried at room temperature in a closed 500 ml flask. The flask was placed in a paraffin oil temperature bath and was fitted with an air cooled condenser. The bath temperature was slowly raised to 125°±2° C. while the slurry was vigorously stirred. As the oil bath temperature exceeded 105° C., gas bubbles were observed in the agitated slurry, presumably caused by the decomposition of PF to formaldehyde gas. The slurry was opaque prior to the formation of bubbles but after 30 minutes it became clearer. The solution was held at 125° C. for 90 minutes while vigorous stirring continued. The flask was then sealed from the atmosphere and cooled to room temperature. The solution was transparent but contained gas bubbles and residual PF particles.

It was pressure filtered and left to stand overnight whereby the solid residue and the bubbles were removed.

The membranes were made by casting the solution as a thin film at room temperature onto smooth glass sheets edged with a polyvinyl chloride tape to control the film thickness. The glass plate was immediately placed in a preheated oven at a controlled temperature to evaporate the DMSO solvent. After the evaporation, the glass plate was immediately placed in a gelling solution. The membranes produced were translucent and were typically 0.17 mm in thickness.

The preferable range of evaporation temperature is 170°-180° C., with an optimum about 175° C.

It is advantageous to ensure that the slurry contains no water as water interferes, according to some literature references, with the dissolution of cellulose. In these experiments, cellulose was stored in a desiccator under vacuum before slurrying. For some cellulosic materials having originally a pH significantly different from 7, it may be necessary to bring the pH to neutral e.g. by washing the material with distilled water.

Casting solution compositions and the preparation details for respective membranes are shown in Table I. Where the gelation medium was an organic solvent (membrane No. I and III), the samples were subsequently placed in ice cold water for cellulose regeneration.

TABLE I

| Membrane No. | I | II | III | IV |
|---|---|---|---|---|
| Composition of casting solution, wt. % | | | | |
| Cellulose | 12.3 | 13.4 | 13.6 | 14.3 |
| DMSO | 75.4 | 73.2 | 72.8 | 71.4 |
| paraformaldehyde | 12.3 | 13.4 | 13.6 | 14.3 |
| Film casting conditions | | | | |
| Temperature of casting solution | room | room | room | room |
| Solvent evaporation temperature, °C. | 175 | 160 | 152 | 142 |
| Solvent evaporation time, min. | 10 | 10 | 10 | 10 |
| Gelation medium[a] | EtOH | water | i-PrOH | water |
| Gelation temperature, °C. | room | room | room | room |

[a]Gelation period 100 min.

Reverse osmosis experiments were conducted on the membranes obtained by the above-described procedure. The pore radii of the membranes were found to be less than $30 \times 10^{-10}$ m. In these experiments, the effective membrane surface was 13.2 cm$^2$. The membranes were operated at 1724 kPag (ca. 250 psig). The inorganic solute concentrations were determined by electroconductivity measurement.

The results of the reverse osmosis experiments are shown in Table II.

TABLE II

| Reverse Osmosis Experimental Results | | | | |
|---|---|---|---|---|
| Membrane no. | Solute | Feed conc., molal | Pure water[a] permeation g/h | Product[a] rate, g/h | Solute separation % |
| I | NaCl | 0.001 | 6.05 | 5.62 | 76.4 |
| I | NaF | 0.004 | 6.05 | 5.70 | 68.6 |
| I | Na$_2$SO$_4$ | 0.004 | 6.05 | 5.30 | 87.1 |
| I | Na$_2$HPO$_4$ | 0.009 | 6.05 | 6.02 | 88.9 |
| I | Na$_2$SO$_4$ | 0.001 | 6.05 | 6.02 | 95.5 |
| I | t-Butanol | 0.001 | 6.05 | 5.84 | 47.7 |
| I | l-Octanol | 0.0005 | 6.05 | 5.92 | 63.7 |
| I | Sucrose | 0.0007 | 6.05 | 5.81 | 69.5 |
| I | Anisole | 0.0001 | 6.05 | 5.89 | 84.3 |
| I | Phenol | 0.0004 | 6.05 | 5.87 | 23.7 |
| I | Benzene | 0.0001 | 6.05 | 5.97 | 85.6 |
| I | t-Butyl i-Propyl ether | 0.0002 | 6.05 | 5.64 | 83.6 |
| I | PEG-1000[b] | 52.8[c] | 6.05 | 5.68 | 77.3 |
| I | PEG-6000[b] | 58.1[c] | 6.05 | 6.05 | 96.6 |
| II | MgSO$_4$ | 0.015 | 7.50 | 7.10 | 58.7 |
| II | sucrose | 0.0008 | 7.50 | 7.36 | 43.7 |
| III | RbCl | 0.003 | 6.24 | 6.13 | 62.6 |
| III | NaF | 0.004 | 6.24 | 6.04 | 65.6 |
| IV | MgSO$_4$ | 0.015 | 7.14 | 6.87 | 59.1 |
| IV | sucrose | 0.0008 | 7.14 | 7.01 | 42.7 |

[a]effective membrane surface is 13.2 cm$^2$
[b]polyethylene glycol
[c]ppm

It is apparent that the improved method of the invention provides conditions for preparing good reverse osmosis membranes capable of yielding significant separation for a variety of inorganic and organic solutes. While the above examples give an indication as to the expected performance of the membranes obtained by the method of the invention, it will be appreciated that some testing work may be necessary to select optimum membrane preparation conditions for a specific reverse osmosis application, the conditions being within the scope of the invention as defined by the appended claims.

We claim:

1. A method of manufacturing a reverse osmosis membrane of cellulosic material, comprising the steps of:
   (a) dissolving the cellulosic material in a dimethyl sulfoxide/paraformaldehyde solvent to form a casting solution containing
      (i) 12-15 wt % cellulose,
      (ii) 70-76 wt % dimethyl sulfoxide, and
      (iii) 12-15 wt % paraformaldehyde at an elevated temperature while formaldehyde gas is evolved and until a transparent casting solution is formed,
   (b) cooling the casting solution to about room temperature,
   (c) casting the cooled solution at about room temperature,
   (d) evaporating the solvent from the cast solution at a temperature in the range 140°-180° C., and
   (e) gelling the cast solution in a gelling medium comprising at least one liquid selected from the group consisting of water, an alcohol having carbon atoms in the range 1 to 4, acetone and methyl ethyl ketone at a temperature of 0°-30° C.

2. The method of claim 1 where the cellulosic material is dissolved at a temperature of 125°±2° C.

3. The method of claim 2 wherein the solvent evaporation temperature is 170°-180° C.

4. The method of claim 1 wherein the solvent evaporation temperature is 170°-180° C.

5. A cellulose membrane obtained by the steps of
   (a) dissolving the cellulosic material in a dimethyl sulfoxide/paraformaldehyde solvent to form a casting solution containing
      (i) 12-15 wt % cellulose,
      (ii) 70-76 wt % dimethyl sulfoxide, and
      (iii) 12-15 wt % paraformaldehyde at an elevated temperature while formaldehyde gas is evolved and until a transparent casting solution is formed, (b) cooling the casting solution to about room temperature,
(c) casting the cooled solution at about room temperature,
(d) evaporating the solvent from the cast solution at a temperature in the range 140°–180° C., and
(e) gelling the cast solution in a gelling medium comprising at least one liquid selected from the group consisting of water, an alcohol having carbon atoms in the range 1 to 4, acetone and methyl ethyl ketone at a temperature of 0°–30° C.

6. The membrane of claim 5 having pore radii below $30 \times 10^{-10}$ m.

* * * * *

UNITED STATES PATENT AND TRADEMARK OFFICE
CERTIFICATE OF CORRECTION

PATENT NO. : 4,814,084
DATED       : March 21, 1989
INVENTOR(S) : Brian Farnand et al It is certified that error appears in the above-identified patent and that said Letters Patent is hereby corrected as shown below:

```
Column 1, line 61 to
Column 2, line 14 should follow immediately after
Column 2, line 42.
```

Signed and Sealed this

Twelfth Day of September, 1989

Attest:

DONALD J. QUIGG

*Attesting Officer*    *Commissioner of Patents and Trademarks*